Figure 1:
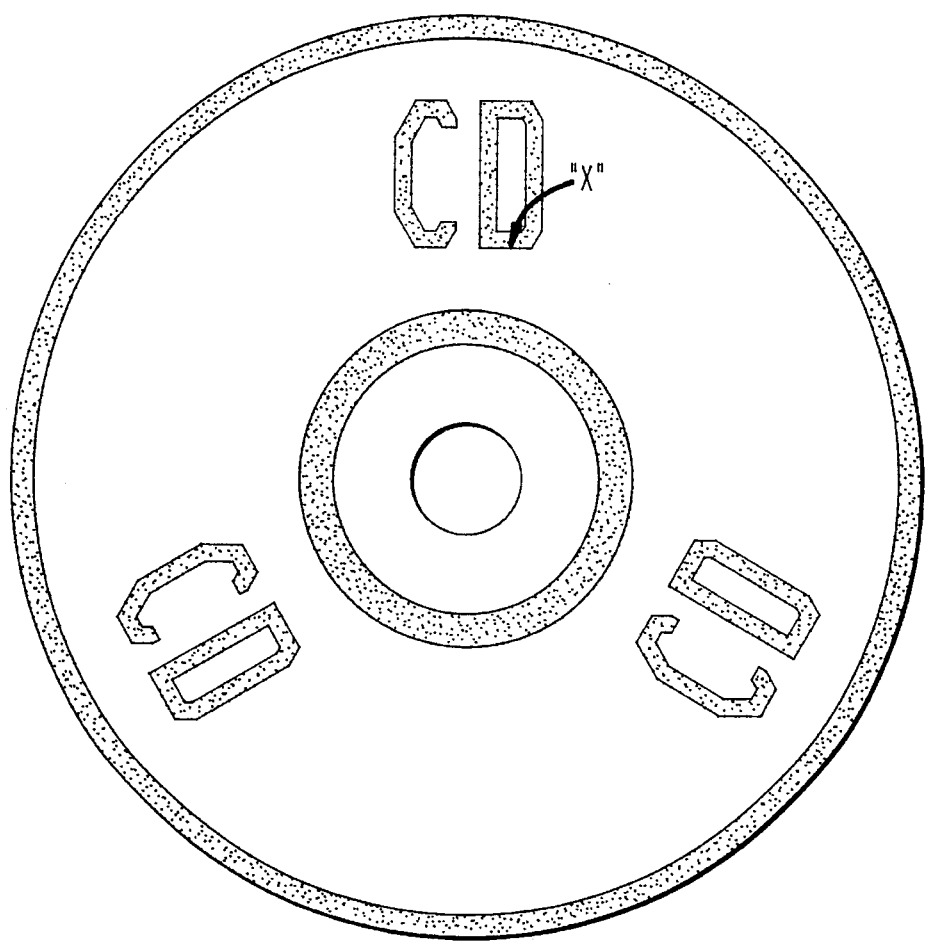

United States Patent [19]

Schiewe

[11] Patent Number: 5,608,718
[45] Date of Patent: Mar. 4, 1997

[54] DISK-SHAPED OPTICAL STORAGE MEDIUM EXHIBITING AN IDENTIFICATION MARK, AND METHOD OF MAKING SUCH A STORAGE MEDIUM

[75] Inventor: Hilmar Schiewe, Gütersloh, Germany

[73] Assignee: Sonopress Produktionsgesellschaft für Ton- und Informationsträger mbH, Gütersloh, Germany

[21] Appl. No.: 335,728

[22] PCT Filed: Mar. 24, 1994

[86] PCT No.: PCT/EP94/00944

§ 371 Date: Nov. 7, 1994

§ 102(e) Date: Nov. 7, 1994

[87] PCT Pub. No.: WO94/24665

PCT Pub. Date: Oct. 27, 1994

[30] Foreign Application Priority Data

Apr. 8, 1993 [DE] Germany ............... 43 11 683.3

[51] Int. Cl.⁶ ............................................. G06K 19/06
[52] U.S. Cl. ........................ 369/275.4; 369/275.3; 369/273
[58] Field of Search .................. 369/275.4, 275.3, 369/277, 278, 279; 430/321, 320; 428/64.1, 64, 2

[56] References Cited

U.S. PATENT DOCUMENTS 4,967,286  10/1990  Nomula .
5,398,231   3/1995  Shin et al. ................. 369/275.4

FOREIGN PATENT DOCUMENTS 0520251  12/1992  European Pat. Off. .
4274038   9/1992  Japan ........................ 369/275.4
9101358   3/1993  Netherlands .
2250626   6/1992  United Kingdom .

OTHER PUBLICATIONS

Patent Abstracts of Japan vol. 10. 312 (P-509), Oct. 23, 1986.

Primary Examiner—David C. Nelms
Assistant Examiner—Vu A. Le
Attorney, Agent, or Firm—Henry M. Feiereisen

[57] ABSTRACT

A disk-shaped optical storage medium for binary information, stored serially as a sequence of pits and lands along a spiral track in the form of pits and lands readable by means of a laser beam according to the principle of interference may be identified in a manner preventing confusing and unauthorized duplication in that a selected number of the total lands is formed in the optical reference surface as depressions which are shallow in comparison to the depth of the pits. This identification feature of basically any form may be both so small that it can only be rendered visible by electron microscopic means and so large that it can be detected by the naked eye in diffused light.

5 Claims, 1 Drawing Sheet

DISK-SHAPED OPTICAL STORAGE MEDIUM EXHIBITING AN IDENTIFICATION MARK, AND METHOD OF MAKING SUCH A STORAGE MEDIUM

The invention relates to a disk-shaped optical storage medium for binary information, stored serially as a sequence of pits and lands along a spiral track in a smooth optical reference surface, the pit and land lengths, which are independent from each other, representing the stored binary values which are readable by means of a tracked focussed laser beam according to the principle of interference. The invention further relates to a method of fabricating a so-called glass master, from which dies can be copied, which in turn serve the mass production of such a disk-shaped storage medium.

One of the most well-known storage media of the aforementioned kind is the compact disc, the salient properties of which are defined by the Standard IEC 908 and by the specification "Compact Disc Digital Audio System Description", June 1989, published by Sony Corp. and N. V. Philips. Among other things the compact disc has the following features: the information is recorded serially in the form of a spiral track on a smooth reference surface and readable in the reflection mode by means of a focussed laser beam. In the plane of the smooth reference surface the focussing diameter is equivalent to the track width of approx. 1 μm. Within the track a sequence of troughshaped recesses, the so-called pits are provided which are separated from each other in the track direction and in the radial direction by regions of the smooth reference surface. The regions of the reference surface located in the track direction between neighboring pits are called lands. The width of the pits amounts to less than half the track width. The lengths of the pits and lands represent the stored binary values such that, as viewed in the track direction, each transition between a pit and a land or between a land and a pit is detected as logic one, the remaining regions of both the pits and the lands as logic zero, however. For detecting the transitions use is made of the principle of destructive interference known from German patent 2,208,379. This is at an optimum for a disk surface of consistent reflection when, on the one hand, the depth of the pits corresponds precisely to a quarter of the wavelength of the reading light bundle, on the other, when one half of the light incident is reflected by the regions of the smooth reference surface surrounding the corresponding pit (including the lands), the other half by the bottom of the pits. The sequence of pits and lands would then furnish maximum amplitude modulation of the reflected light bundle. The mandatory requirement for non-contact reading an optical storage medium is, however, also obtaining a tracking signal from the reflected portion of the reading light bundle. The tracking signal is, however, for a pit depth of $\lambda/4=0$, while passing through a maximum at a pit depth of $\lambda/8$, however.

Thus, neither with the compact disc nor with any other optical storage medium working according to this same reading principle can use be made of the optimum pit depth of $\alpha/4$ for retrieving the information signal. Instead, the pit depth amounts to approx. $0.225\ \lambda$. For a compact disc having $n=1.46$, which, as is known, is read through the transparent polycarbonate, and at the usual wavelength of 780 nm of the laser light, i.e. at a wavelength of 534 nm in polycarbonate, the pit depth thus amounts to 120 nm.

From the German laid-open patent application 4,121,505 a further development of the optical storage medium of the aforementioned kind is known which has the objective of simplifying the method of fabrication by allowing greater tolerances in pit depth and particularly to permit speeding up clocking the injection molding machines used to mold the storage medium without endangering the compatibility of the storage medium with a storage medium of the kind as stated at the outset. For this purpose, in the further-developed storage medium instead of the sequence of pits and lands a full-length groove is provided with is modulated in depth, namely exhibiting first regions of greater depth, corresponding to the pits, and second regions of lesser depth, corresponding to the lands, with steplike transitions located inbetween. In this arrangement the depth of the first regions is dimensioned precisely equal to the aforementioned optimum of one quarter of the wavelength of the reading light bundle, whilst the depth of the second region amounts to roughly a sixteenth of this wavelength.

Of the storage media of the aforementioned kind particularly the compact disc has achieved great popularity and a correspondingly high economic significance. Producers in this field are now confronted increasingly with the problem of bootleg products and piracyware. Since the method of production of such optical media has since become general art and mastered well, neither the trade and not at all the end-user is able to distinguish piracyware from the original ware.

It is therefore the object of the invention to provide a discshaped storage medium of the kind concerned with a durable identification feature (of basically any shape and size) which is exceptionally difficult to imitate and which can be reliably detected by optical means.

The object is achieved according to the invention in that a selected number of the total lands is formed in the optical reference surface as depressions which are shallow in comparison to the depth of the pits.

It has been surprisingly found out that irrespective of the number of lands brought out in this way from the optical reference surface the compatibility of such a storage medium is also not detrimented even when the pit depth fails to be equivalent to the proposed $0.25\ \lambda$ of German laid-open patent 4,121,505 but instead to the $0.225\ \lambda$ otherwise stated in prior art. The proposal according to the invention thus allows the manufacturer to provide each and every storage medium with an identification feature in the form of a number of lands configured as shallow depressions at one or more given locations without any additional expense whatsoever during the production process. In the extreme case this identification feature may be so small, i.e. involving so few lands, that it can only be rendered visible by means of an electron microscope, this also with reasonable time expense only when the location of this identification feature is known.

It is, of course, not necessary that the lands recessed in the optical reference surface serving to identify the storage medium are directly in sequence in the tracking direction and can thus also be separated by more than 1 pit and the "normal" lands located between these pits. In addition, it is not necessary that all of the recessed lands have the same depth. Instead, within a prescribed depth region the depths of the lands may differ randomly or according to a given pattern.

A further, unexpected effect consists in that the lands formed according to the invention, although recessed in the optical reference surface only to fractions of the wavelength of the reading light bundle, result in effects which are visually apparent even when illuminated with diffuse white light (e.g. daylight) by the unaided eye when a sufficient number of such lands is provided. Accordingly, preference is given to an embodiment in which the lands formed sequentially as depressions in the tracking direction and/or neighboring in the radial direction constitute a macroscopic pattern. Depending on the angle of incidence and observation of the light, this pattern is highlighted from the remaining surface of the storage medium by a departure in the gray step, similar to that of a socalled watermark. It will readily be appreciated that the visual pattern produced in this way may be basically of any kind whatsoever, i.e. it may reproduce the name or logo of the manufacturer, for example, the title of the stored program material and the like.

Preferred possibilities of configuring the geometry of the lands formed as depressions are stated in the claims 3 thru 5. To the extent that in claim 1 the lands serving as the identification feature are termed "shallow" as compared to the depth of the pits and this depth is stated in claim 5 as being a maximum of 30% of the depth of the pits, these requirements relate to the case of the identification feature produced thereby being located within the storage medium area required for reading the storage medium. This area covers e.g. on a CD—in addition to the so-called program region—a lead-in region and a lead-out region. The areas of the storage medium located outside of these regions are negligable as regards reading and thus for proper functioning of the player. Here, the above limitations as to the depth of the special lands used to identify the storage medium, i.e. recessed in the optical reference surface do not apply. This means that as regards pits and lands arranged outside of the storage area required to read the storage medium the depth of the lands recessed in the optical reference surface can be any and thus, for instance, may be optimized so that the resulting identification feature has an exceptionally high contrast as compared to the remaining storage medium surface and thus is particularly easy to detect by the unaided eye.

The further object of the invention of providing a method of fabricating a glass master, by means of which and via the usual intermediate steps an optical storage medium may be produced having the proposed identification feature, is achieved in that in the region of the lands to be formed as depressions in the optical reference surface the intensity of the laser beam is reduced to a value amounting to a maximum of 50% of the value of intensity generating the pits within the storage area required to read the storage medium and outside of this area is located between a technically feasible minimum value and 100% of the value of intensity generating the pits. In other words the laser beam is blanked as usual in the region of the normal lands, whereas in the region of the lands formed as depressions in the optical reference surface it is switched to a value of intensity which is less that that employed to generate the pits. If the depth of the lands formed as a depression in the optical reference surface is thereby to be varied, use is made of a number of differing values of intensity corresponding to the number of different depths.

Figure 2:
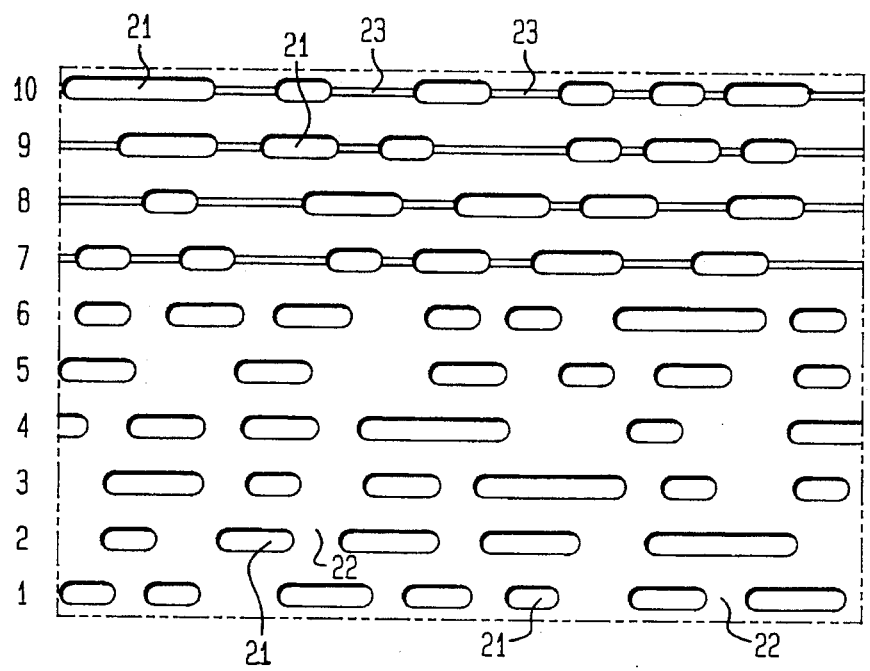

The invention will now be explained with reference to the drawing in which:

FIG. 1 is a view of a compact disc as seen from above, provided with an identification feature "CD" in accordance with the present proposal and FIG. 2 is a surface topography, e.g. at the location "X" in FIG. 1, in a slanting view and magnified roughly 6000 times.

The compact disc illustrated in FIG. 1 merely representative of optical storage media of the kind as stated at the outset is shown with a watermark-type identification feature "CD", also to be appreciated merely by way of example, presented in the overall reflecting surface as a modified (darker) gray value. Depending on the angle of observation all three identification features, but also depending on the circumstances, one or two thereof are visible.

In FIG. 2 the surface topography is illustrated in a slanting view, as seen from the pressing side. The tracks represented are numbered (arbitrarily) on the left margin. The sections taken from the tracks 1 thru 6—which due to the high magnification appear to be linear, but macroscopically are in spiral sequence—show sequences of pits 21 and lands 22 differing in length in accordance with the binary information stored in the partial region shown. Lands 22 are, in other words, the regions of the optical reference surface belonging to the track concerned.

By contrast, in the tracks 7 thru 10—in the section shown in this case—the lands having depressions 23 which are shallow in comparison to the depth of the unaltered pits 21 are formed in the optical reference surface. It is evident that the lands configured in this way have a U-shaped cross-sectional profile and are only slightly narrower than the pits 21. Where the pits 21 and the lands 22 or 23 are not generated by the known laser-optical/photographic method but e.g. by means of a cutting stylus on the so-called master, both the pits 21 and the lands 23 constitute in cross-section the negative of the shape of the cutting stylus, i.e. they each have a vee-shaped cross-sectional profile. Due to their slight depth—preferably less than 20% of the depth of the pits— the lands then automatically have a substantially smaller width than the pits (not shown).

In the presented embodiment lands 23 formed as shallow depressions are generated or written in the surface areas of the compact disc shown in FIG. 1 in which the identification feature "CD" is arranged like a watermark, whilst in all other surface areas the lands 22 remain as usual. When instead of the macroscopic identification feature "CD" selected in this case a disk-shaped optical storage medium is to be provided with a "concealed" identification feature, i.e. not discernible to the naked eye and even non-detectable with a light (optical) microscope, then for this purpose the number of the 1 lands 23 configured according to the proposal of this invention simply needs to be reduced correspondingly and formed at a location known only to the manufacturer of the storage medium. Furthermore, conventional lands 22 and lands 23 formed according to the invention may be sequenced within the same track, this sequence in turn representing a binary information, if required.

The starting point in fabricating disk-shaped optical storage media of the present kind is usually a glass master, which is coated with a photoresist and exposed trackwise by a laser beam. Wherever the photoresist is exposed the depressions termed as pits result following development of the glass master. If lands 23 of the proposed kind are to be written, the intensity of the exposing laser beam in the corresponding regions is not reduced to zero but to a value amounting to several 10% of the value of intensity generating the pits.

What is claimed:

1. A disk-shaped optical storage medium for binary information, stored serially as a sequence of pits and lands along a spiral track in a smooth optical reference surface, the pit and land lengths, which are independent from each other, representing the stored binary values which are readable by means of a tracked focussed laser beam according to the principle of interference wherein a selected number of the total lands is formed in the optical reference surface as depressions which are shallow in comparison to the depth of the pits and wherein said lands formed sequentially as depressions in the tracking direction and/or neighboring in the radial direction constitute a macroscopic pattern to form an identification.

2. The storage medium as set forth in claim 1, wherein said lands (23) formed as depressions have a U-shaped cross-sectional profile and a width roughly corresponding to the width of said pits (21).

3. The storage medium as set forth in claim 1, wherein said lands formed as depressions have a veeshaped cross-sectional profile and a width less than that of said pits.

4. The storage medium as set forth in claims 1, wherein the depth of said lands (23) formed as depressions is less than 30% of the depth of said pits (21).

5. A method of making a glass master for a disk-shaped optical storage medium, comprising the steps of:

coating a glass substrate with a photoresist; and trackwise exposing the photoresist to a laser beam and developing the exposed photoresist to create a smooth optical reference surface with pits formed at the exposed spots and with lands provided as depressions between pits to form an identification, with the laser beam having in the region of the lands an intensity which is reduced to an extent amounting to a maximum of about 50% of the intensity to generate the pits within the storage area required to read the storage medium and ranging outside the storage area between an appropriate minimum value and 100% of the intensity value generating the pits.

* * * * *